United States Patent
Fujiwara et al.

(10) Patent No.: US 11,319,965 B2
(45) Date of Patent: May 3, 2022

(54) BEARING STRUCTURE

(71) Applicant: DAIKIN INDUSTRIES, LTD., Osaka (JP)

(72) Inventors: Hideki Fujiwara, Osaka (JP); Kuuma Okada, Osaka (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 17/485,068

(22) Filed: Sep. 24, 2021

(65) Prior Publication Data
US 2022/0010803 A1 Jan. 13, 2022

Related U.S. Application Data

(63) Continuation of application No. PCT/JP2020/012780, filed on Mar. 23, 2020.

(30) Foreign Application Priority Data

Mar. 27, 2019 (JP) .............................. JP2019-060390

(51) Int. Cl.
*F16C 19/06* (2006.01)
*F16C 33/58* (2006.01)
(Continued)

(52) U.S. Cl.
CPC ............ *F04D 29/049* (2013.01); *F16C 19/06* (2013.01); *F16C 33/585* (2013.01);
(Continued)

(58) Field of Classification Search
CPC .. F16C 19/06; F16C 32/0402; F16C 32/0442; F16C 32/0474; F16C 33/585;
(Continued)

(56) References Cited

U.S. PATENT DOCUMENTS 3,588,205 A * 6/1971 Daugherty et al. ... F16C 33/586
384/473
6,617,733 B1 9/2003 Yamauchi et al.
(Continued)

FOREIGN PATENT DOCUMENTS

DE 102016211143 A1 * 12/2017 ............ F16C 35/063
EP 2 863 521 A2 4/2015
(Continued)

OTHER PUBLICATIONS

International Preliminary Report of corresponding PCT Application No. PCT/JP2020/012780 dated Oct. 7, 2021.
(Continued)

*Primary Examiner* — Phillip A Johnson
(74) *Attorney, Agent, or Firm* — Global IP Counselors, LLP

(57) ABSTRACT

A bearing structure includes a drive shaft that extends in a horizontal direction, a touchdown bearing, and a bearing housing. The drive shaft is supported by a magnetic bearing. The touchdown bearing includes a rolling member interposed between an outer ring and an inner ring. The bearing housing supports the touchdown bearing from an outer periphery. At least one of an outer peripheral surface of the drive shaft, an inner peripheral surface of the inner ring, an outer peripheral surface of the outer ring, and an inner peripheral surface of the bearing housing includes a recess in a region overlapping the rolling member in a bearing radial direction.

20 Claims, 8 Drawing Sheets

(51) Int. Cl.
*F04D 29/049* (2006.01)
*F04D 29/048* (2006.01)
*F16C 32/04* (2006.01)

(52) U.S. Cl.
CPC ........ *F04D 29/048* (2013.01); *F16C 32/0474* (2013.01); *F16C 2360/44* (2013.01)

(58) Field of Classification Search
CPC .... F16C 33/586; F16C 35/063; F16C 35/067; F16C 39/02; F16C 2360/44; F04B 29/048; F04B 29/049; F04B 29/058; F04B 29/059
See application file for complete search history.

(56) References Cited

U.S. PATENT DOCUMENTS

| | | | |
|---|---|---|---|
| 2013/0170943 A1* | 7/2013 | Jonsson | F16C 19/54 415/1 |
| 2015/0167687 A1* | 6/2015 | Kurihara | F04D 29/059 415/229 |
| 2017/0138403 A1 | 5/2017 | Taniguchi et al. | |

FOREIGN PATENT DOCUMENTS

| | | |
|---|---|---|
| JP | 53-139047 | 12/1978 |
| JP | 2-280646 A | 11/1990 |
| JP | 5-209621 A | 8/1993 |
| JP | 9-236096 A | 9/1997 |
| JP | 10-176714 A | 6/1998 |
| JP | 11-257353 A | 9/1999 |
| JP | 2000-346068 A | 12/2000 |
| JP | 2003-269452 A | 9/2003 |
| JP | 2004-11801 A | 1/2004 |
| JP | 2006-226268 A | 8/2006 |
| JP | 2011-226582 A | 11/2011 |
| JP | 2017-89844 A | 5/2017 |
| JP | 2017-96414 A | 6/2017 |
| JP | 2018-31408 A | 3/2018 |

OTHER PUBLICATIONS

International Search Report of corresponding PCT Application No. PCT/JP2020/012780 dated Jun. 16, 2020.

* cited by examiner

BEARING STRUCTURE

CROSS-REFERENCE TO RELATED APPLICATIONS

This is a continuation of International Application No. PCT/JP2020/012780 filed on Mar. 23, 2020, which claims priority to Japanese Patent Application No. 2019-060390, filed on Mar. 27, 2019. The entire disclosures of these applications are incorporated by reference herein.

BACKGROUND

Field of Invention

The present disclosure relates to a bearing structure of a drive shaft supported by a magnetic bearing.

Background Information

Japanese Unexamined Patent Publication No. 2000-346068 discloses a bearing structure including a drive shaft supported by a magnetic bearing, a touchdown bearing in which a rolling member is interposed between an outer ring and an inner ring, and a holding member housing the touchdown bearing. In this bearing structure, a buffer member for absorbing impact at the time of touchdown is inserted between the touchdown bearing and the holding member.

SUMMARY

A first aspect of the present disclosure relates to a bearing structure. The bearing structure includes a drive shaft that extends in a horizontal direction, a touchdown bearing, and a bearing housing. The drive shaft is supported by a magnetic bearing. The touchdown bearing includes a rolling member interposed between an outer ring and an inner ring. The bearing housing supports the touchdown bearing from an outer periphery. At least one of an outer peripheral surface of the drive shaft, an inner peripheral surface of the inner ring, an outer peripheral surface of the outer ring, and an inner peripheral surface of the bearing housing includes a recess in a region overlapping the rolling member in a bearing radial direction.

DETAILED DESCRIPTION OF EMBODIMENT(S)

Embodiments of the present disclosure will be described in detail with reference to the drawings. The embodiments below are merely exemplary ones in nature, and are not intended to limit the scope, applications, or use of the invention.

First Embodiment

Figure 1:
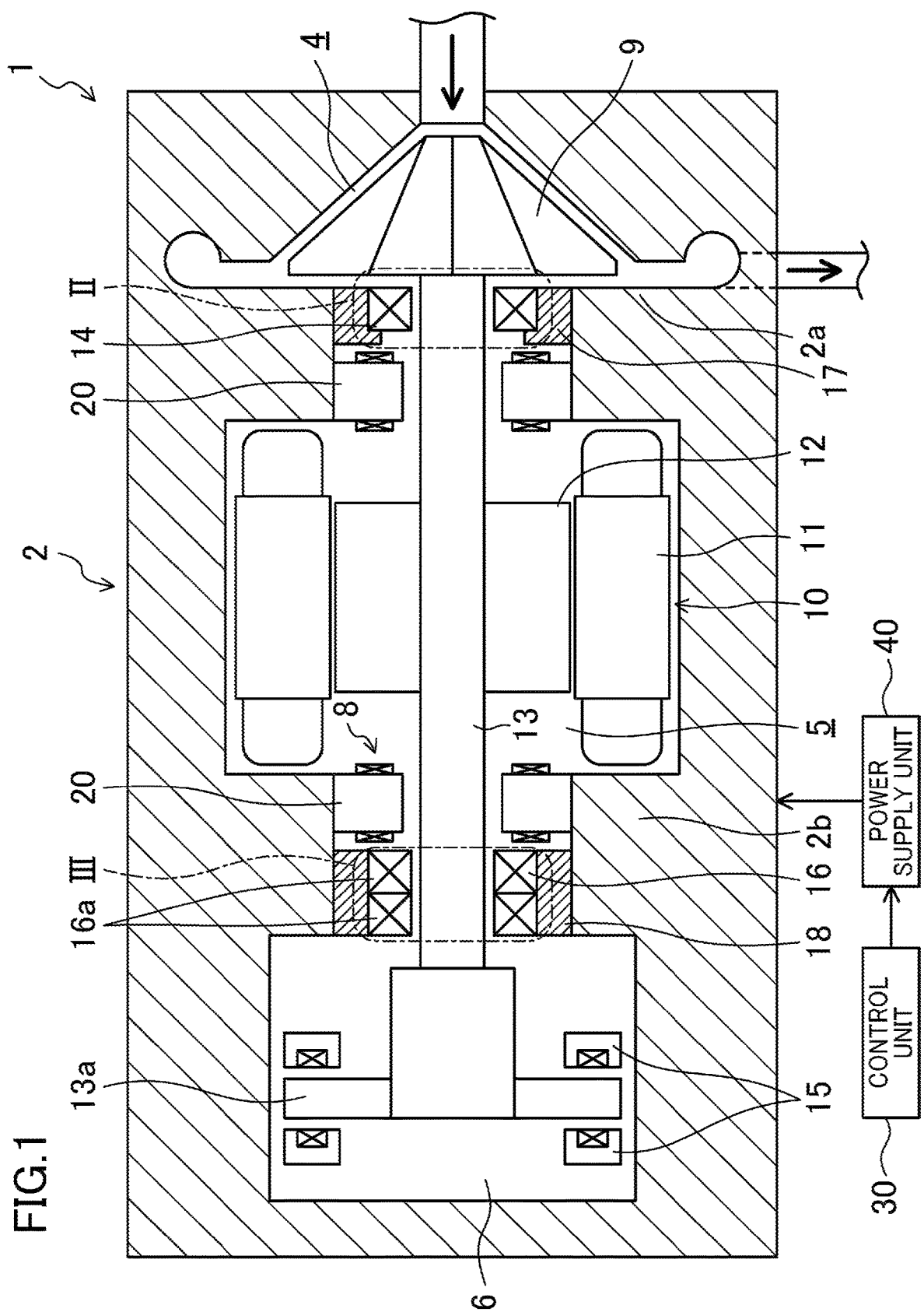
FIG. 1 is a schematic view showing a structure of a turbo compressor to which a bearing structure of a first embodiment of the present disclosure is applied.

FIG. 1 illustrates a turbo compressor (1) to which a bearing structure of a first embodiment of the present disclosure is applied. This turbo compressor (1) includes an impeller (9), an electric motor (10), a casing (2), a control unit (30), and a power supply unit (40).

The impeller (9) is formed by a plurality of blades to have a substantially conical outer shape.

The electric motor (10) drives the impeller (9). The electric motor (10) is a so-called permanent magnet synchronous motor. Specifically, the electric motor (10) includes a drive shaft (13), an electric motor stator (11), a rotor (12), and a bearing mechanism (8). The drive shaft (13) is made from steel material or stainless steel. One end of the drive shaft (13) is fixed to a center of a wider-side face of the impeller (9). At the other end of the drive shaft (13), a disk portion (13a) is formed in a protruding manner. The electric motor stator (11) and the rotor (12) are arranged in this order viewed from the outer periphery to surround an intermediate portion in a longitudinal direction of the drive shaft (13).

The bearing mechanism (8) includes two magnetic bearings (20, 20), a first touchdown bearing (14), thrust magnetic bearings (15, 15), and a second touchdown bearing (16).

Each of the magnetic bearings (20, 20) includes a plurality of electromagnets (not shown). Synthesized electromagnetic force obtained by combining electromagnetic forces of the electromagnets (not shown) is applied to the drive shaft (13) so that the drive shaft (13) is supported in a non-contact manner. The magnetic bearings (20, 20) are provided on both axial sides of an installation site of the rotor (12).

Figure 2:
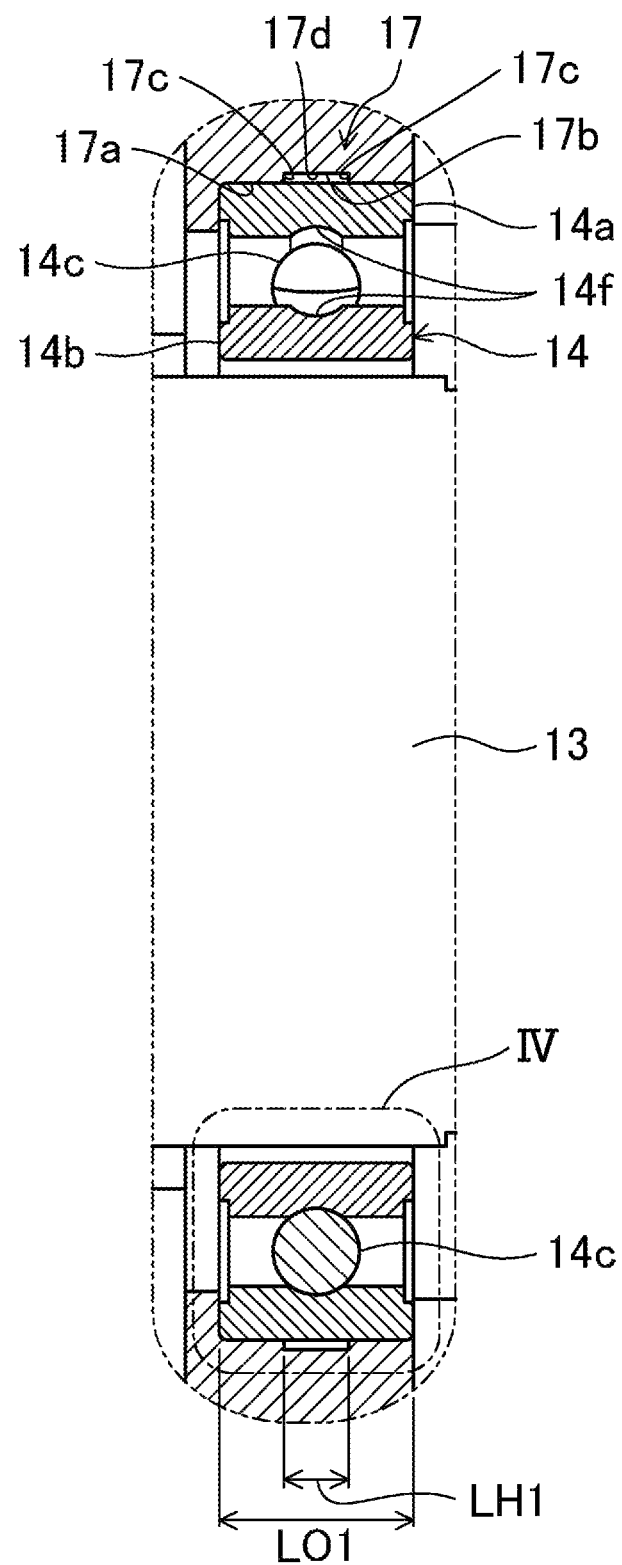
FIG. 2 is an enlarged view of a part II shown in FIG. 1.
Figure 4:
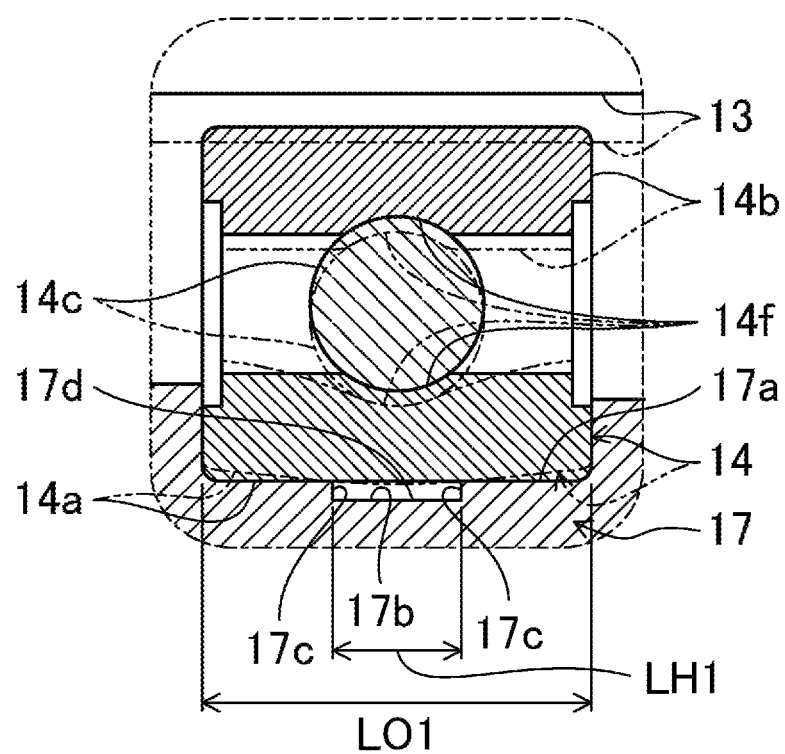
FIG. 4 is an enlarged view of a part IV shown in FIG. 2.

The first touchdown bearing (14) is a ball bearing and subject to radial load. As illustrated in FIGS. 2 and 4, the first touchdown bearing (14) includes an outer ring (14a) and an inner ring (14b). A ball (14c) as a rolling member is interposed between the outer ring (14a) and the inner ring (14b). A recessed groove (14f) in which the ball (14c) is fitted is formed in an axial center between an inner peripheral surface of the outer ring (14a) and an outer peripheral surface of the inner ring (14b). The ball (14c) is thus fitted in the recessed groove (14f) of the outer ring (14a) and the inner ring (14b). The first touchdown bearing (14) supports the drive shaft (13) when the magnetic bearing (20) is non-energized. The first touchdown bearing (14) is arranged between the magnetic bearing (20) closer to the impeller (9) and the impeller (9).

The thrust magnetic bearings (15, 15) include electromagnets (not shown) and are configured to support the disk portion (13a) of the drive shaft (13) in a non-contact manner using electromagnetic force.

Figure 3:
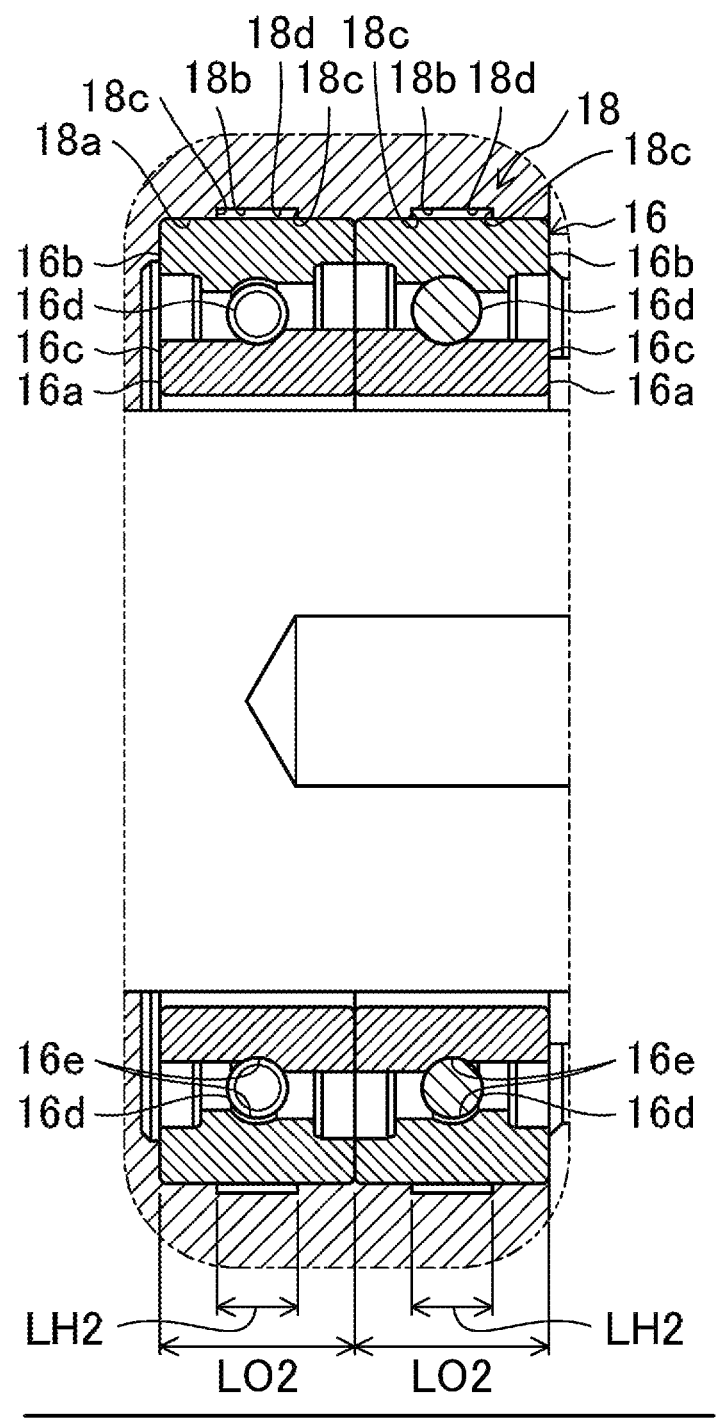
FIG. 3 is an enlarged view of a part III shown in FIG. 1.

The second touchdown bearing (16) is a combined angular contact ball bearing obtained by combining two single-row angular contact ball bearings (16a) and receives radial load and thrust load. As illustrated in FIG. 3, in each of the single-row angular contact ball bearings (16a), a ball (16d) as a rolling member is interposed between an outer ring (16b) and an inner ring (16c). A recessed groove (16e) in which the ball (16d) is fitted is formed in an axial middle part between the inner peripheral surface of the outer ring (16b) and the inner peripheral surface of the inner ring (16c). The ball (16d) is thus fitted in the recessed groove (16e) of the outer ring (16b) and the inner ring (16c). The second touchdown bearing (16) also supports the drive shaft (13)

when the magnetic bearing (20) is non-energized. Hereinafter, the radial direction of the first and second touchdown bearings (14, 16) is referred to as a bearing radial direction, and the circumferential direction of the first and second touchdown bearings (14, 16) is referred to as a bearing circumferential direction. The outer rings (14a, 16b), the inner rings (14b, 16c), and the balls (14c, 16d) of the first and second touchdown bearings (14, 16) are made from steel or alloy steel.

The casing (2) is formed into a substantially cylindrical shape with its both ends closed, and arranged such that the cylindrical axis is oriented in a horizontal direction. An impeller chamber (4) for housing the impeller (9) is formed near the one end of the casing (2). An electric motor chamber (5) for housing an electric motor stator (11) and a rotor (12) is formed in a substantially longitudinal central portion of the casing (2). Near the other end of the casing (2), there is formed a thrust magnetic bearing housing chamber (6) for housing the disk portion (13a) of the drive shaft (13) and the thrust magnetic bearings (15). The casing (2) includes, on its inner peripheral surface, a first wall part (2a) and a second wall part (2b) each formed into an annular shape and protruding toward the inner peripheral side. The first wall part (2a) defines the impeller chamber (4) and the electric motor chamber (5). The second wall part (2b) defines the electric motor chamber (5) and the thrust magnetic bearing housing chamber (6). At an inner peripheral side of the first wall part (2a) close to a lateral end of the impeller chamber (4), there is provided a first bearing housing (17) formed into an annular shape. The first bearing housing (17) supports the first touchdown bearing (14) from its outer periphery. At an inner peripheral side of the second wall part (2b) close to a lateral end part of the thrust magnetic bearing housing chamber (6), there is provided a second bearing housing (18) formed into an annular shape. The second bearing housing (18) supports the second touchdown bearing (16) from its outer periphery. The first and second bearing housings (17, 18) are made from steel material, aluminum, or stainless steel.

As also illustrated in FIGS. 2 and 3, on an entire inner peripheral surface of the first bearing housing (17), there is formed a first recessed portion (17a) into which an outer peripheral part of the first touchdown bearing (14) is to be fitted. The first recessed portion (17a) includes a bottom surface (the inner peripheral surface of the first bearing housing (17)) having a region overlapping the ball (14c) of the first touchdown bearing (14) in the bearing radial direction. In the region, there is formed a first housing groove (17b) as a recess that has a U-shaped cross section, is formed into an annular shape and extends in the entire bearing circumferential direction. The first housing groove (17b) overlaps the entire recessed groove (14f) of the outer ring (14a) in the bearing radial direction, and is located at an axial center of the outer ring (14a). The axial length LH1 of the first housing groove (17b) is 4 mm and the axial length LO1 of the outer ring (14a) of the first touchdown bearing (14) is 12 mm. The axial length LH1 of the first housing groove (17b) is 33% of the axial length LO1 of the outer ring (14a) of the first touchdown bearing (14). The first housing groove (17b) includes side surface portions (17c) facing each other and a bottom surface portion (17d) connecting the side surface portions (17c) to each other and facing in the axial direction.

The second bearing housing (18) includes, on its entire inner peripheral surface, a second recessed portion (18a) into which the outer peripheral part of the second touchdown bearing (16) is to be fitted. The second recessed portion (18a) includes a bottom surface (the inner peripheral surface of the second bearing housing (18) having a region overlapping the ball (16d) of the second touchdown bearing (16) in the bearing radial direction. In the region, there is formed a second housing groove (18b) as a recess that has a U-shaped cross section, is formed into an annular shape and extends in the entire bearing circumferential direction. The second housing groove (18b) overlaps the entire recessed groove (16e) of the outer ring (16b) in the bearing radial direction. The axial length LH2 of the second housing groove (18b) is 7 mm and the axial length LO2 of the outer ring (16b) of the second touchdown bearing (16) is 16 mm. The axial length LH2 of the second housing groove (18b) is 44% of the axial length LO2 of the outer ring (16b) of the second touchdown bearing (16). The second housing groove (18b) includes side surface portions (18c) facing each other and a bottom surface portion (18d) connecting the side surface portions (18c) to each other and facing in the axial direction.

In accordance with detected values for levitation control output by, for example, a gap sensor (not shown) capable of detecting a gap between the disk portion (13a) and the thrust magnetic bearings (15, 15), a gap sensor (not shown) capable of detecting a gap between the electric motor stator (11) and the rotor (12) etc., the control unit (30) controls voltage to be applied to the magnetic bearings (20,20) and the thrust magnetic bearing (15) such that the drive shaft (13) is located in a desirable position.

The power supply unit (40) applies voltage to the magnetic bearings (20, 20) and the thrust magnetic bearings (15, 15) through control of the control unit (30).

In the turbo compressor (1) configured as described above, when abnormality such as power failure, failure of a levitation control sensor, and a system down occurs, the drive shaft (13) magnetically levitated falls to come into contact with (touch down on) the inner peripheral surface of the inner ring (14b) of the first touchdown bearing (14) from above as indicated by imaginary lines of FIG. 4, and the load of the drive shaft (13) acts on the lower half of the outer ring (14a) via the inner ring (14b) and the ball (14c). As a result, a portion of the lower half of the outer ring (14a) overlapping the ball (14c) in the bearing radial direction (an axial center of the lower half of the outer ring (14a)) is deflected into the first housing groove (17b) (toward the outer peripheral side), and both axial ends of the lower half of the outer ring (14a) are deflected toward the inner peripheral side, thereby absorbing impact. When falling as mentioned above, the drive shaft (13) also comes into contact with the inner peripheral surface of the inner ring (16c) of each single-row angular contact ball bearings (16a) of the second touchdown bearing (16) from above. In this way the load of the drive shaft (13) acts on the lower half of the outer ring (16b) via the inner ring (16c) and the ball (16d) of each single-row angular contact ball bearing (16a). Accordingly, a portion of the lower half of the outer ring (16b) overlapping the ball (16d) in the bearing radial direction (an axial center of the lower half of the outer ring (16b)) is deflected into the second housing groove (18b) (toward the outer peripheral side), and both axial ends of the lower half of the outer ring (16b) are deflected toward the inner peripheral side, thereby absorbing impact. Therefore, it is not necessary to provide an additional buffer member as in the case of the invention of Japanese Unexamined Patent Publication No. 2000-346068 besides the first and second touchdown bearings (14, 16) so that the number of components can be reduced.

According to the first embodiment, it is not necessary to provide, as a buffer member absorbing impact at the time of touchdown, a corrugated plate member made from metal between the first and second touchdown bearings (14, 16) and the first and second bearing housings (17,18), respectively, thereby eliminating the need for forming a groove, into which the corrugated plate member is to be fitted, with highly accurate concentricity. In addition, there is no fear that the first and second touchdown bearings (14, 16) become eccentric depending on the degree of the accuracy of the corrugated plate member. Hence, the quality of the turbo compressor (1) can be improved.

The axial length LH1 of the first housing groove (17b) is 20% or more of the axial length LO1 of the outer ring (14a) of the first touchdown bearing (14). Accordingly, as compared with the case in which the axial length LH1 is below 20% of the axial length LO1, the outer ring (14a) of the first touchdown bearing (14) is easily deflected into the first housing groove (17b). Therefore, it is possible to more reliably obtain the effect of absorbing impact when the drive shaft (13) falls.

The axial length LH1 of the first housing groove (17b) is below 50% of the axial length LO1 of the outer ring (14a) of the first touchdown bearing (14). Accordingly, as compared with the case in which the axial length LH1 is 50% or more of the axial length LO1, the contact area of the inner peripheral surface of the first bearing housing (17) with respect to the outer ring (14a) of the first touchdown bearing (14) is less likely to be plastically deformed by pressure from the first touchdown bearing (14).

The axial length LH2 of the second housing groove (18b) is 20% or more of the axial length LO2 of the outer ring (16b) of the second touchdown bearing (16). Accordingly, as compared with the case in which the axial length LH2 is below 20% of the axial length LO2, the outer ring (16b) of the second touchdown bearing (16) is easily deflected into the second housing groove (18b). Therefore, it is possible to more reliably obtain the effect of absorbing impact when the drive shaft (13) falls.

When aluminum is used as material of the first and second bearing housings (17, 18), the first and second bearing housings (17, 18) are easily plastically deformed by pressure from the first and second touchdown bearings (14, 16). The axial length LH2 of the second housing groove (18b) is below 50% of the axial length LO2 of the outer ring (16b) of the second touchdown bearing (16). Accordingly, as compared with the case in which the axial length LH2 is 50% or more of the axial length LO2, the contact area of the inner peripheral surface of the second bearing housing (18) with respect to the outer ring (16b) of the second touchdown bearing (16) is less likely to be plastically deformed by pressure from the second touchdown bearing (16).

The outer peripheral surface of the drive shaft (13) is provided with no groove for making the inner rings (14b, 16c) of the respective first and second touchdown bearings (14, 16) deflected. Accordingly, there is no need for making the drive shaft (13) thinner by the depth of the groove. Hence, as compared with the case in which the drive shaft (13) is provided with such a groove, the durability of the drive shaft (13) can be improved.

If the balls (14c, 16d) of the first and second touchdown bearings (14, 16) thermally expand when the drive shaft (13) falls during rotation at a high speed, the portion of the outer ring (14a) of the first touchdown bearing (14) overlapping the ball (14c) in the bearing radial direction is deflected into the first housing groove (17b) (toward the outer peripheral side), and the portion of the outer ring (16b) of the second touchdown bearing (16) overlapping the ball (16d) in the bearing radial direction is deflected into the second housing groove (18b) (toward the outer peripheral side). Therefore, the outer rings (14a, 16b) and the inner rings (14b, 16c) are less likely to be damaged by thermal expansion of the balls (14c, 16d). Accordingly, there is no need to use expensive ceramic having a low coefficient of thermal expansion as material of the balls (14c, 16d), resulting in reduction in material cost.

Second Embodiment

Figure 5:
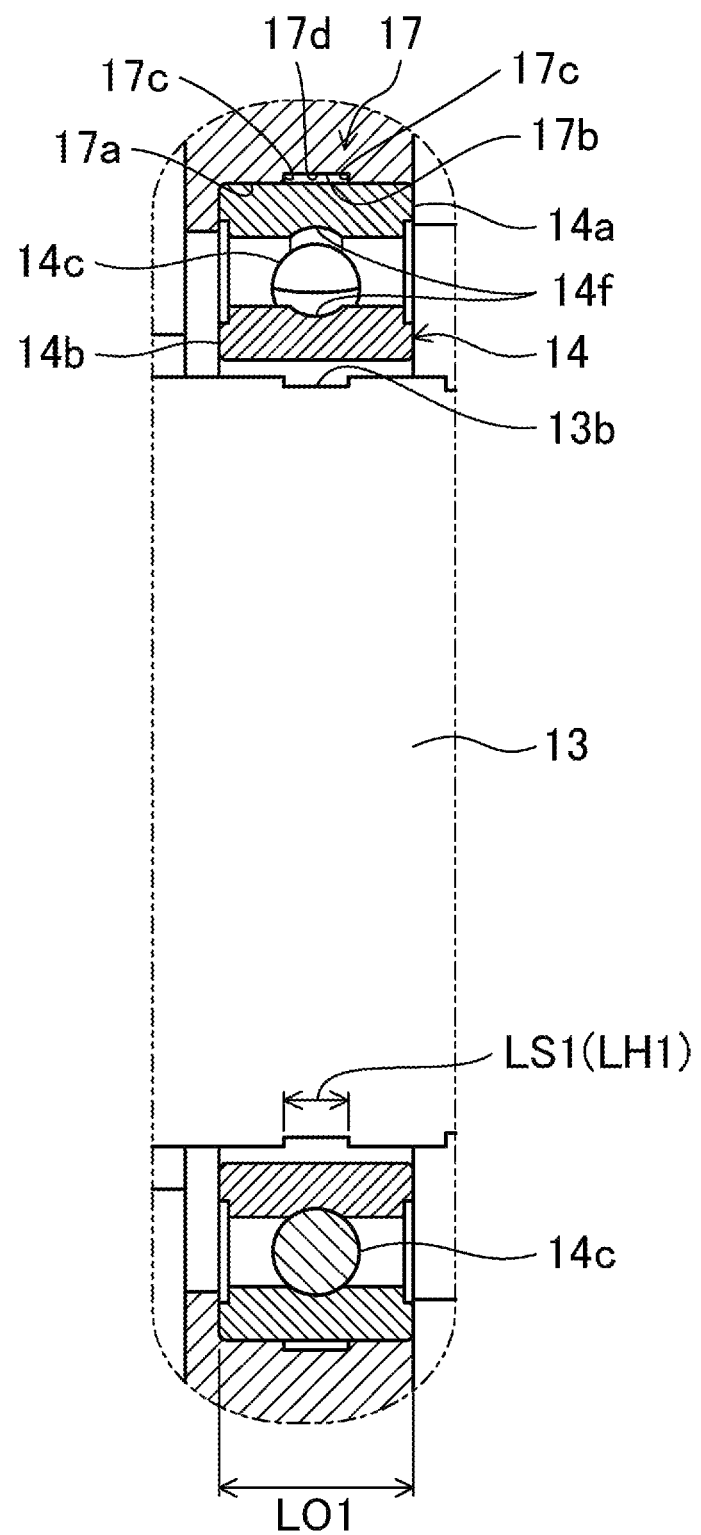
FIG. 5 is a view of a second embodiment corresponding to FIG. 2.
Figure 6:
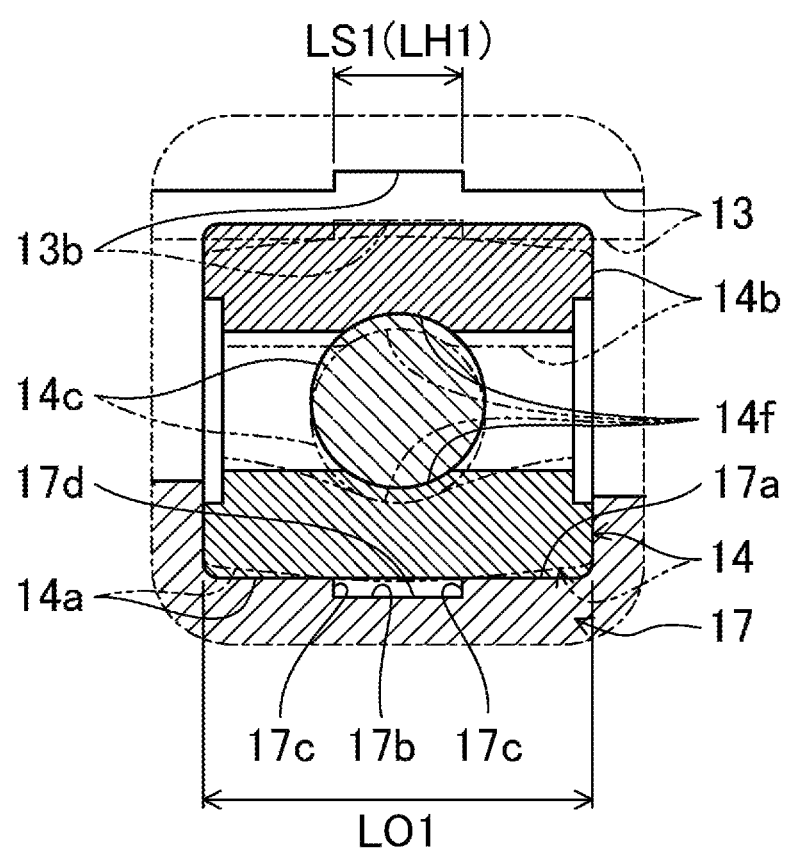
FIG. 6 is a view of the second embodiment corresponding to FIG. 4.

FIG. 5 is a view of a second embodiment corresponding to FIG. 2. According to the second embodiment, as also illustrated in FIG. 6, there is provided a first drive shaft groove (13b) as a recess, which is formed into an annular shape, has a U-shaped cross section, and extends in the entire bearing circumferential direction, in a region of the outer peripheral surface of the drive shaft (13) overlapping the ball (14c) of the first touchdown bearing (14) in the bearing radial direction. The first drive shaft groove (13b) is formed in the same position as the first housing groove (17b) viewed in the axial direction. The first drive shaft groove (13b) overlaps the entire recessed groove (14f) of the outer ring (14a) in the bearing radial direction. The axial length LS1 of the first drive shaft groove (13b) is 33% of the axial length LO1 of the outer ring (14a) of the first touchdown bearing (14). In addition, a second drive shaft groove (not shown) is also formed in a region of the outer peripheral surface of the drive shaft (13) overlapping the ball (16d) of the single-row angular contact ball bearing (16a) of the second touchdown bearing (16) in the bearing radial direction. The axial length of the second drive shaft groove is 44% of the axial length LO2 of the outer ring (16b) of the second touchdown bearing (16).

When the drive shaft (13) falls, as indicated by imaginary lines of FIG. 6, the load of the drive shaft (13) acts on both axial ends of the inner ring (14b) of the first touchdown bearing (14). Accordingly, the both axial ends of the lower half of the inner ring (14b) are deflected toward the outer peripheral side, and a portion of the lower half of the inner ring (14b) overlapping the ball (14c) in the bearing radial direction (an axial center of the lower half of the inner ring (14b)) is deflected into the first drive shaft groove (13b) (toward the inner peripheral side), thereby absorbing impact. The load of the drive shaft (13) also acts on both axial ends of the inner ring (16c) of each single-row angular contact ball bearing (16a) of the second touchdown bearing (16). Accordingly, both axial ends of the lower half of the inner ring (16c) are deflected toward the outer peripheral side, and a portion of the lower half of the inner ring (16c) overlapping the ball (16d) in the bearing radial direction (an axial center of the lower half of the inner ring (16c)) is deflected into the second drive shaft groove (not shown) (toward the inner peripheral side), thereby absorbing impact. As in the case of the first embodiment, the outer rings (14a, 16b) of the first and second touchdown bearings (14, 16) are also deflected. In this way, when the drive shaft (13) falls, both the outer rings (14a, 16b) and the inner rings (14b, 16c) of the respective first and second touchdown bearings (14, 16) are deflected, thereby absorbing impact more effectively.

Since the other configurations are the same as those of the first embodiment, the same reference characters are given to the same configurations, and detailed description thereof will be omitted.

According to the second embodiment, the axial length LS1 of the first drive shaft groove (13b) is 20% or more of the axial length LO1 of the outer ring (14a) of the first touchdown bearing (14). Accordingly, as compared with the case in which the axial length LS1 is below 20% of the axial length LO1, the outer ring (14a) of the first touchdown bearing (14) is easily deflected into the first drive shaft groove (13b). Therefore, it is possible to more reliably obtain the effect of absorbing impact when the drive shaft (13) falls.

When aluminum is used as material of the drive shaft (13), the drive shaft (13) is capable of being easily plastically deformed by pressure from the first and second touchdown bearings (14, 16). The axial length LS1 of the first drive shaft groove (13b) is below 50% of the axial length LO1 of the outer ring (14a) of the first touchdown bearing (14). Accordingly, as compared with the case in which the axial length LS1 is 50% or more of the axial length LO1, the contact area of the outer peripheral surface of the drive shaft (13) with respect to the inner ring (14b) of the first touchdown bearing (14) is less likely to be plastically deformed by pressure from the first touchdown bearing (14).

Third Embodiment

Figure 7:
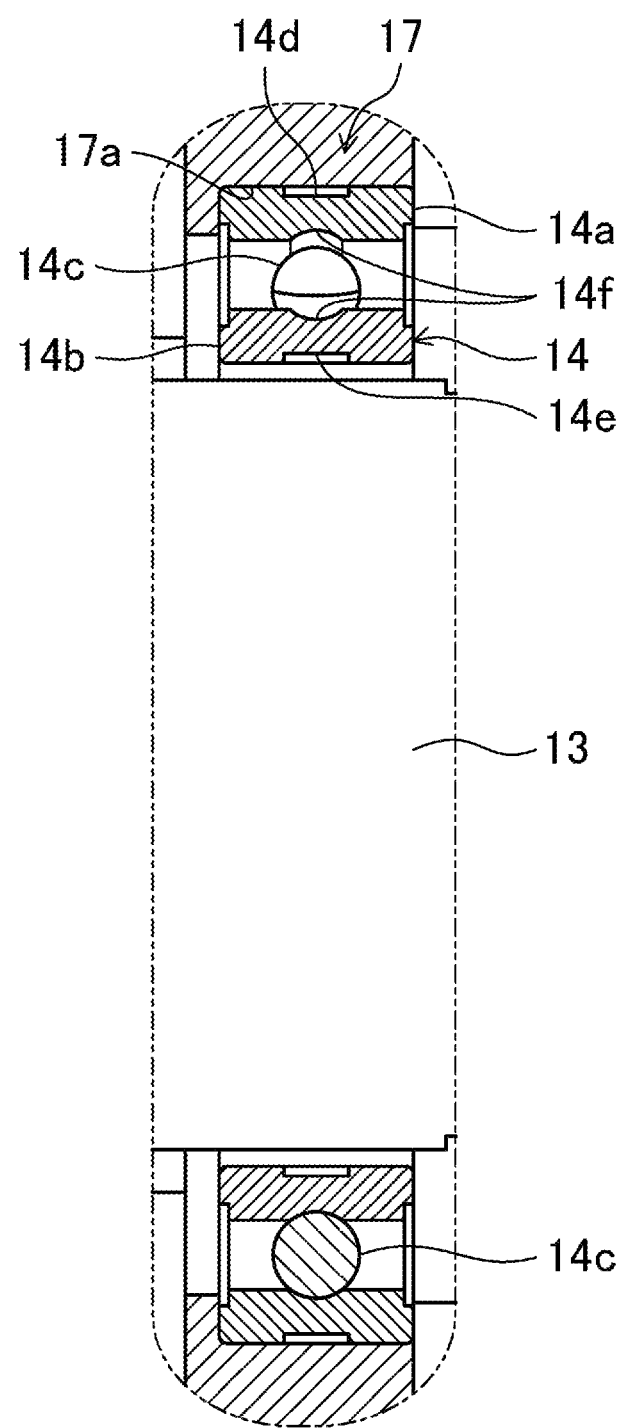
FIG. 7 is a view of a third embodiment corresponding to FIG. 2.

FIG. 7 is a view of a third embodiment corresponding to FIG. 2. In an area of an outer peripheral surface of the outer ring (14a) and the inner peripheral surface of the inner ring (14b) of the first touchdown bearing (14) overlapping the ball (14c) in the bearing radial direction, there are formed a first outer bearing groove (14d) and a first inner bearing groove (14e). Also in an area of an outer peripheral surface of the outer ring (16b) and the inner peripheral surface of the inner ring (16c) of each single-row angular contact ball bearing (16a) of the second touchdown bearing (16) overlapping the ball (16d) in the bearing radial direction, there are formed a second outer bearing groove (not shown) and a second inner bearing groove (not shown). No first housing groove (17b) is formed in the first bearing housing (17), and no second housing groove (18b) is formed in the second bearing housing (18).

Since the other configurations are the same as those of the first embodiment, the same reference characters are given to the same configurations, and detailed description thereof will be omitted.

According to the third embodiment, only the first and second touchdown bearings (14,16) should be provided with grooves. There is no need for a process forming grooves in the drive shaft (13) and the first and second bearing housings (17, 18).

Fourth Embodiment

Figure 8:
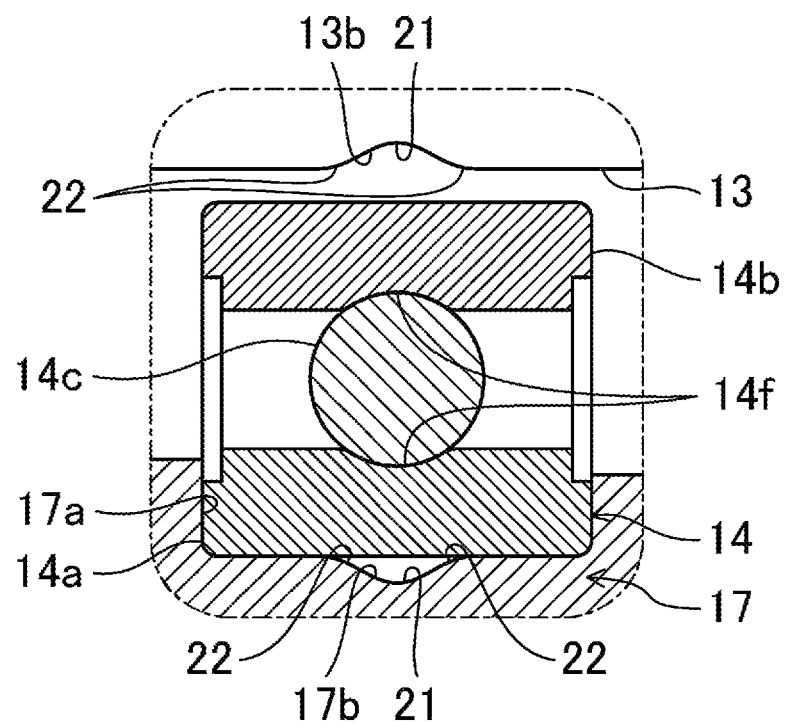
FIG. 8 is a view of a fourth embodiment corresponding to FIG. 4.

FIG. 8 is a view of a fourth embodiment corresponding to FIG. 4. According to the fourth embodiment, the first housing groove (17b), the second housing groove (18b), the first drive shaft groove (13b), and the second drive shaft groove (not shown) are each formed to have a substantially V-shaped cross section. A bottom-side rounded part (21) is formed over the entire length of the bottom of the first housing groove (17b), the second housing groove (18b), the first drive shaft groove (13b), and the second drive shaft groove (not shown). Edge-side rounded parts (22) are formed over the entire length of edges of both sides in the axial direction of the first housing groove (17b), the second housing groove (18b), the first drive shaft groove (13b), and the second drive shaft groove (not shown).

Since other configurations are the same as those of the second embodiment, the same reference characters are given to the same configurations, and detailed description thereof will be omitted.

According to the fourth embodiment, the edge-side rounded parts (22) are formed at the edges of the first housing groove (17b) and the second housing groove (18b). Accordingly, it is possible to reduce the risk of stress concentration on the edges of the first housing groove (17b) and the second housing groove (18b), thereby making the first and second bearing housings (17, 18) have improved durability.

Similarly, the edge-side rounded parts (22) are formed at the edges of the first drive shaft groove (13b) and the second drive shaft groove (not shown). Accordingly, it is possible to reduce the risk of stress concentration on the edges of the first drive shaft groove (13b) and the second drive shaft groove (not shown), thereby improving durability of the drive shaft (13).

Fifth Embodiment

Figure 9:
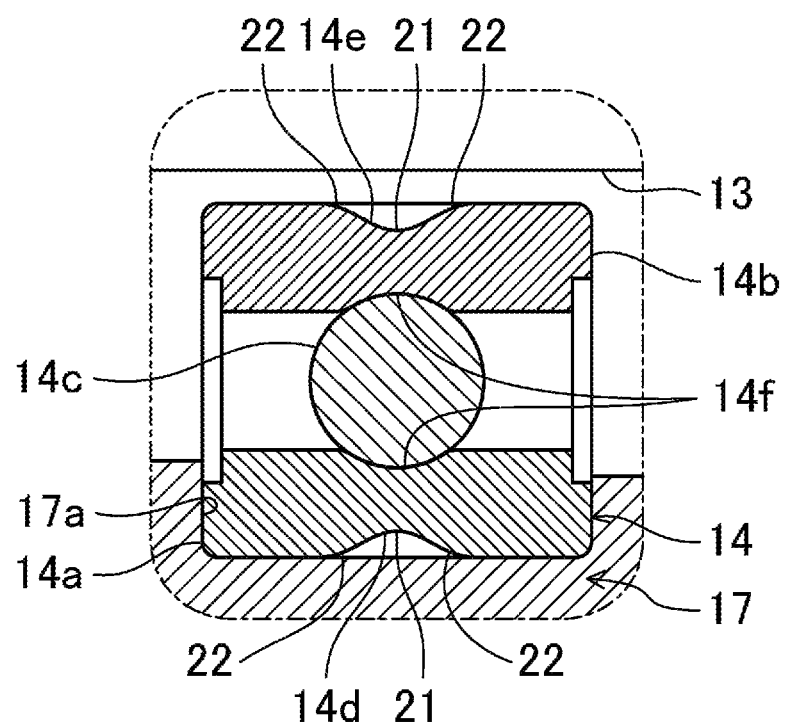
FIG. 9 is a view of a fifth embodiment corresponding to FIG. 4.

FIG. 9 is a view of a fifth embodiment corresponding to FIG. 4. According to the fifth embodiment, the first outer bearing groove (14d), the first inner bearing groove (14e), the second outer bearing groove (not shown), and the second inner bearing groove (not shown) are each formed to have a substantially V-shaped cross section. A bottom-side rounded part (21) is formed over the entire length of the bottom of the first outer bearing groove (14d), the first inner bearing groove (14e), the second outer bearing groove (not shown), and the second inner bearing groove (not shown). Edge-side rounded parts (22) are formed over the entire length of edges of both sides in the axial direction of the first outer bearing groove (14d), the first inner bearing groove (14e), the second outer bearing groove (not shown), and the second inner bearing groove (not shown).

Since the other configurations are the same as those of the third embodiment, the same configurations are denoted by the same reference characters, and detailed description thereof will be omitted.

According to the fifth embodiment, the edge-side rounded parts (22) are formed at the edges of the first outer bearing groove (14d) and the second outer bearing groove (not shown). Accordingly, it is possible to reduce the risk of stress concentration on portions of the first and second bearing housings (17, 18) where they come into contact with the edges of the first outer bearing groove (14d) and the second outer bearing groove (not shown), thereby making the first and second bearing housings (17, 18) have improved durability.

Similarly, the edge-side rounded parts (22) are formed at the edges of the first inner bearing groove (14e) and the second inner bearing groove (not shown). Accordingly, it is possible to reduce the risk of stress concentration on the portions of the drive shaft (13) where they come into contact with the edges of the first inner bearing groove (14e) and the second inner bearing groove (not shown), thereby improving durability of the drive shaft (13).

Other Embodiments

According to the first to fifth embodiments, the first touchdown bearing (14) is configured as ball bearing including the ball (14c) as a rolling member. However, other rolling bearings are also applicable such as a roller bearing with a cylinder as a rolling member.

According to the first, second and fourth embodiments, the first housing groove (17b) is formed on the entire circumference of the inner peripheral surface of the first bearing housing (17). However, the configuration is also possible in which the first housing groove is not formed on a part of an upper half region of the inner peripheral surface of the first bearing housing (17) in the circumferential direction. In addition, it is also possible to form the first housing groove (17*b*) only in a lower half region of the inner peripheral surface of the first bearing housing (17) whereas the first housing groove (17*b*) is not formed over the upper half region (a half) of the inner peripheral surface of the first bearing housing (17) in the circumferential direction. Similarly, it is also possible that the second housing groove (18*b*) is not formed on the entire or a part of the circumference of the upper half region of the inner peripheral surface of the second bearing housing (18).

According to the third and fifth embodiments, the first outer bearing groove (14*d*) is formed on the entire circumference of the outer peripheral surface of the outer ring (14*a*) of the first touchdown bearing (14). It is also possible that the first outer bearing groove (14*d*) is not formed on the entire or a part of the circumference of the upper half region of the outer peripheral surface. Similarly, the second outer bearing groove (not shown) is not formed on the entire or a part of the circumference of the upper half region the outer peripheral surface of the outer ring (16*b*) of each single-row angular contact ball bearing (16*a*) of the second touchdown bearing (16).

While the embodiment and variations have been described above, it will be understood that various changes in form and details can be made without departing from the spirit and scope of the claims. The above embodiments and variations may be appropriately combined or replaced as long as the functions of the target of the present disclosure are not impaired.

The present disclosure is useful as a bearing structure.

The invention claimed is:

1. A bearing structure, comprising:
a drive shaft that extends in a horizontal direction, the drive shaft being supported by a magnetic bearing;
a touchdown bearing including a rolling member interposed between an outer ring and an inner ring; and
a bearing housing supporting the touchdown bearing from an outer periphery,
at least one of an outer peripheral surface of the drive shaft, an inner peripheral surface of the inner ring, an outer peripheral surface of the outer ring, and an inner peripheral surface of the bearing housing including a recess in a region overlapping the rolling member in a bearing radial direction.

2. The bearing structure of claim 1, wherein
a rounded part is formed on an edge of the recess.

3. The bearing structure of claim 2, wherein
the recess overlaps an entire groove formed in the outer ring, the rolling member is fitted in the bearing radial direction in the groove, and an axial length of the recess is at least 20% of an axial length of the outer ring.

4. The bearing structure of claim 3, wherein
the recess is not formed on the outer peripheral surface of the drive shaft.

5. The bearing structure of claim 3, wherein
the recess is formed on the outer peripheral surface of the outer ring, and
the recess is not formed on at least a part of an upper half region of the outer peripheral surface of the outer ring in the circumferential direction.

6. The bearing structure of claim 3, wherein
the recess is formed on the inner peripheral surface of the bearing housing, and
the recess is not formed in at least a part of an upper half region of the inner peripheral surface of the bearing housing in the circumferential direction.

7. The bearing structure of claim 2, wherein
the recess is not formed on the outer peripheral surface of the drive shaft.

8. The bearing structure of claim 7, wherein
the recess is formed on the outer peripheral surface of the outer ring, and
the recess is not formed on at least a part of an upper half region of the outer peripheral surface of the outer ring in the circumferential direction.

9. The bearing structure of claim 2, wherein
the recess is formed on the outer peripheral surface of the outer ring, and
the recess is not formed on at least a part of an upper half region of the outer peripheral surface of the outer ring in the circumferential direction.

10. The bearing structure of claim 2, wherein
the recess is formed on the inner peripheral surface of the bearing housing, and
the recess is not formed in at least a part of an upper half region of the inner peripheral surface of the bearing housing in the circumferential direction.

11. The bearing structure of claim 1, wherein
the recess overlaps an entire groove formed in the outer ring, the rolling member is fitted in the bearing radial direction in the groove, and an axial length of the recess is at least 20% of an axial length of the outer ring.

12. The bearing structure of claim 11, wherein
the recess is not formed on the outer peripheral surface of the drive shaft.

13. The bearing structure of claim 11, wherein
the recess is formed on the outer peripheral surface of the outer ring, and
the recess is not formed on at least a part of an upper half region of the outer peripheral surface of the outer ring in the circumferential direction.

14. The bearing structure of claim 11, wherein
the recess is formed on the inner peripheral surface of the bearing housing, and
the recess is not formed in at least a part of an upper half region of the inner peripheral surface of the bearing housing in the circumferential direction.

15. The bearing structure of claim 1, wherein
the recess is not formed on the outer peripheral surface of the drive shaft.

16. The bearing structure of claim 15, wherein
the recess is formed on the outer peripheral surface of the outer ring, and
the recess is not formed on at least a part of an upper half region of the outer peripheral surface of the outer ring in the circumferential direction.

17. The bearing structure of claim 15, wherein
the recess is formed on the inner peripheral surface of the bearing housing, and
the recess is not formed in at least a part of an upper half region of the inner peripheral surface of the bearing housing in the circumferential direction.

18. The bearing structure of claim 1, wherein
the recess is formed on the outer peripheral surface of the outer ring, and
the recess is not formed on at least a part of an upper half region of the outer peripheral surface of the outer ring in the circumferential direction.

19. The bearing structure of claim 18, wherein
the recess is formed on the inner peripheral surface of the bearing housing, and
the recess is not formed in at least a part of an upper half region of the inner peripheral surface of the bearing housing in the circumferential direction.

20. The bearing structure of claim 1, wherein
the recess is formed on the inner peripheral surface of the bearing housing, and
the recess is not formed in at least a part of an upper half region of the inner peripheral surface of the bearing housing in the circumferential direction.

* * * * *